United States Patent [19]

Lent et al.

[11] Patent Number: 4,967,342
[45] Date of Patent: Oct. 30, 1990

[54] DATA PROCESSING SYSTEM HAVING PLURALITY OF PROCESSORS AND CHANNELS CONTROLLED BY PLURALITY OF SYSTEM CONTROL PROGRAMS THROUGH INTERRUPT ROUTING

[76] Inventors: Robert S. Lent, 450 Stratford Park Ct., San Jose, Calif. 95136; Arthur C. Willis, 267 Casitas Blvd., Los Gatos, Calif. 95030; Robert W. Doran, 52 Marine Parade, Herne Bay, Auckland, New Zealand

[21] Appl. No.: 312,732

[22] Filed: Feb. 17, 1989

Related U.S. Application Data

[60] Division of Ser. No. 930,965, Nov. 12, 1986, which is a continuation of Ser. No. 500,379, Jun. 2, 1983, abandoned.

[51] Int. Cl.$^5$ ............................ G06F 9/22; G06F 9/44; G06F 9/46; G06F 13/32
[52] U.S. Cl. .................................... 364/200; 364/228; 364/228.1; 364/228.2; 364/228.3; 364/230.1; 364/228.6; 364/230.2; 364/231.6; 364/232.7; 364/241.9; 364/281.7
[58] Field of Search ... 364/200 MS File, 900 MS File

[56] References Cited

U.S. PATENT DOCUMENTS

| | | | |
|---|---|---|---|
| 3,421,150 | 1/1969 | Quosig et al. ............... | 340/172.5 |
| 3,648,252 | 3/1972 | Thron et al. ................ | 364/200 |
| 4,001,783 | 1/1977 | Monahan et al. ............. | 340/172.5 |
| 4,253,145 | 2/1981 | Goldberg .................... | 364/200 |
| 4,325,119 | 4/1981 | Grandmaison et al. ......... | 364/200 |
| 4,494,189 | 1/1985 | Bean et al. ................. | 364/200 |
| 4,768,149 | 8/1988 | Konopik et al. .............. | 364/200 |
| 4,814,975 | 3/1989 | Hirosawa et al. ............. | 364/200 |

FOREIGN PATENT DOCUMENTS

| | | |
|---|---|---|
| 0093267 | 9/1981 | European Pat. Off. . |
| 0024434 | 11/1981 | European Pat. Off. . |
| 0106668 | 11/1981 | European Pat. Off. . |

OTHER PUBLICATIONS

R. A. MacKinnon, "The Changing Virtual Machine Environment: Interfaces to Real Hardware, Virtual Hardware, and Other Virtual Machines", IBM Systems Journal, vol. 18, No. 1, pp. 18–46, IBM, New York.
European Search Report, European Patent Office, The Hague, Netherlands, date of search 05/23/89.

*Primary Examiner*—Archie E. Williams, Jr.
*Assistant Examiner*—Emily Y. Chan

[57] ABSTRACT

A host computer functions as one or more variant systems. The host computer stores one or more system control programs, SCP's, where each SCP is provided for production operation of the host computer. The host computer includes common control means for all of the SCP's for controlling the host computer. The host computer also includes extended control means responsive to the one or more SCP's to make the host computer appear as one or more variant systems. The extended control means in the host computer ensures efficient operation of the host computer during production runs of each one or more of the SCP's.

18 Claims, 5 Drawing Sheets

DATA PROCESSING SYSTEM HAVING PLURALITY OF PROCESSORS AND CHANNELS CONTROLLED BY PLURALITY OF SYSTEM CONTROL PROGRAMS THROUGH INTERRUPT ROUTING

This is a division of Ser. No. 06/930,965, filed Nov. 12, 1986, which is a continuation of application Ser. No. 06/500,379, filed Feb. 6, 1983, now abandoned.

BACKGROUND OF THE INVENTION

This invention relates to data processing systems and more particularly to computers that support efficient simultaneous operation of multiple system control programs, each system control program operating in an apparent environment possibly variant from the host computer.

SYSTEM CONTROL AND APPLICATION PROGRAMS

A System Control Program (SCP), also known as an Operating System, is a program that is designed to control an entire computer system. One main SCP for large IBM and IBM compatible computers, for example, is called MVS. Other SCP's in use are DOS, SVS, ACP, MTS and VM/370.

Prior art systems, such as the IBM System/370, have been designed to use only one SCP in a single computer system.

The function of the SCP is to control the computer system. The main function of the computer system is the processing of application programs often called "jobs". The processing of "jobs" is termed "production operation". The computer system under control of an SCP operates in one of two modes, "Supervisor" or "Problem". Jobs are run in the problem mode and the supervisor mode is reserved for the SCP. An interrupt in problem mode is processed in supervisor mode. The mode in which the system is running is designated by the mode control bit "P" as indicated in the following TABLE 1:

TABLE 1

| System/370 Mode Control Bit "P" | |
|---|---|
| Supervisor (0) | Problem (1) |
| ...........P........... | |
| SCP | JOB |

Even though, in the prior art, each SCP is designed typically to control an entire computer system by itself, the following are some of the reasons for having more than one SCP in a single computer system:

to allow new versions of an SCP to be tested without disrupting the running of the old version of the SCP, to facilitate the migration of work from an old SCP to a new SCP, to operate jobs more efficiently, an efficient SCP for each task, because different SCP's are more efficient at different jobs, to have multiple specialized simple SCP's, each tailored to a special task, rather than one general SCP for all tasks where the general SCP is complex and burdened with overhead, to run both old and new SCP's rather than to change old programs that do not run on a new SCP.

VARIANT ENVIRONMENTS

The environment in which SCP's run varies from computer to computer. Different models of computers, even within the same family, have many differences in their functional architectures. These differences often exist to achieve different cost and different performance goals.

As time passes and new models of computers are introduced, the functional architecture evolves to deal with new needs. This evolution causes old and new models of computers to have differences. Also, because evolution takes different directions with large and small computers, differences arise between old and new models based on their size or intended application.

The differences in computers are usually in the nature of variations from a common architectural core. The hardware in each computer devoted to implementing the differences is usually a small fraction of the total hardware.

While variations are only a small fraction of the overall computer, the variations present significant problems to SCP's. An SCP, in general, will only work correctly on a computer that appears to have exactly the hardware on which the SCP was designed to run. Because conventional SCP's are very large and complex they are very difficult to alter to make them run on a variant computer on which they were not designed to run. In order to make an SCP run on a variant for which the SCP was not designed, often it is easier to modify the computer to make the computer appear to be the variant that the SCP expects rather than to alter the SCP. The problem of variants is even more critical when the running of more than one SCP is contemplated since each SCP in general may expect the computer to be a different variant.

In order to understand better the problems faced by multiple SCP's in variant environments a further understanding of SCP's and their hardware support is now described.

TIME-MULTIPLEXED JOBS CONTROLLED BY SCP

Most large computers have many time-multiplexed application programs being run simultaneously, the multiplexing being controlled by the SCP. To ensure that the application programs (also known as jobs) do not interfere with one another or with the SCP, the architecture necessary for running just one job is usually extended to facilitate multiple jobs as follows:

The computer is made to operate in one of two modes, problem and privileged execution modes (called problem state and supervisor state in the IBM System/370). Privileged mode may only be used by the SCP.

New instructions are introduced called privileged instructions. These control the hardware and could used by one job to affect others. Consequently, privileged instructions may only be executed by the computer in privileged mode of operation and are therefore restricted to the SCP. If an attempt is made to execute a privileged instruction by the computer in problem state, an interruption occurs that automatically transfers control to the SCP.

To allow jobs to share the same main storage, main storage addresses for each job are converted using a mapper. The mapper maps each logical address in the job to a physical address. By means of the mapping, each job can use the same logical addresses to refer to separate locations in the physical storage. The mapper ensures that one job's addressing does not interfere with anothers. Hardware is usually used to support this mapping because it is used very frequently (by each instruction). The mapping is usually part of a so-called virtual storage scheme.

All interruptions cause transfer of control to the SCP in privileged mode. The SCP determines which interruptions are for itself and which interruptions are for some specific job.

There is a mechanism for problem mode to transfer control to the SCP in privileged mode, usually by causing an interruption. (In the System/370, a supervisor-call(SVC) interruption is employed.) The SCP's take specific actions as a result of specific transfers of control and hence, the problem programs "see" a problem state computer augmented by the actions taken by the SCP on transfers of control.

I/O operations are only initiated in privileged mode and are performed for problem mode programs by the SCP being invoked. In order for different problem mode programs to use the same device address to refer to different physical I/O devices, thereby sharing the devices among the jobs, the problem-state I/O device addresses are mapped by SCP software into the physical I/O device addresses.

Only the SCP software has knowledge of physical processors. SCP software in privileged mode assigns a processor to a problem-state program for a slice of time by loading a timing device (in the System/370, the CPU timer is the main timing device) which, when it counts down to zero, causes an interruption and transfer of control to privileged-mode SCP software.

VIRTUAL MACHINE SCP'S

By means of the time-multiplexed job mechanisms outlined above, it is possible for one SCP to run another SCP as a problem-state job. The "chief" SCP receives control on all interruptions and an interruption arises whenever the subservient SCP attempts to execute any privileged instruction. The chief SCP, when it takes control from a subservient, can check that the subservient is only dealing with its own subset of the system's resources, perform any address mapping necessary to ensure that only resources in that subset are affected, and alter the environment of the subservient SCP to give the effect that the subservient expects when it is next given control.

By this means it is possible for a problem-mode SCP to 'see' a computer that appears to be exactly the same as the SCP expected except for minor differences such as timing and channel programs that have been dynamically modified. The term "host" is used to describe the actual computer and the term "variant" is used to describe some variants of the actual computer. For this reason, the chief SCP is called a Virtual Machine System (VMS). For IBM systems, the VMS is called VM/370. A VMS is said to support a virtual machine environment for each user program.

Although a VMS (chief SCP) theoretically allows multiple subservient SCP's to run on one computer, as a practical matter, prior art VMS's (chief SCP's) have only been found adequate for non-production testing of subservient SCP's. A VMS has not been adequate for running production SCP's because of VMS overhead.

For example, if MVS (an IBM SCP) is the only SCP running under VM/370, that MVS will only be able to perform about 20% of the work MVS could do if MVS were in sole command of the computer itself. When an SCP, such as MVS, is in sole command, the situation is termed the "native mode" of operation.

VARIANT MACHINES UNDER VMS

VMS as a chief SCP allows variant machines in that undefined or privileged operations cause interruptions and all interruptions are processed by VMS as the chief SCP. VMS may thus cause variant operation for undefined instructions, privileged instructions, and for interruptions. While such variant operation in the prior art has solved some problems, it has had the serious drawback of causing excessive overhead while introducing the complexity of running the full VMS The hierarchy of control in a VMS system is illustrated in the following TABLE 2.

TABLE 2

Hierarchy of Control in a Virtual Machine System

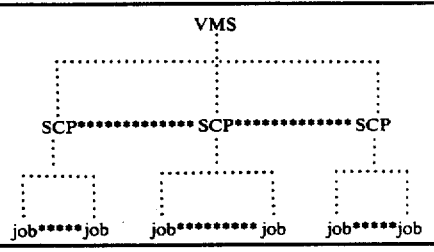

There are three major sources of overhead when VMS is the chief SCP as indicated in the hierarchy of TABLE 2. One major source of VMS overhead is that the subservient SCP's execute many privileged instructions and each causes an interruption to VMS that may take the VMS much longer to process than the native mode instruction takes to execute.

A second major source of VMS overhead is that each of the subservient SCP's maps the addresses used by its jobs to what the SCP thinks are physical addresses (pseudo physical addresses) and the VMS then maps those pseudo physical addresses to the actual physical addresses. Thus, in prior art VMS systems, there are two levels of mapping. For the main storage mapping which is assisted by hardware, the VMS has to trick the single mapping mechanism into compounding both levels of mapping. In System/370, VM/370, virtual storage mapping is defined by "page tables". MVS creates page tables that define the mapping from logical addresses to pseudo physical addresses and VM/370 has page tables that map MVS's pseudo physical addresses to actual physical addresses. Since the System/370 hardware only supports one level of mapping using page tables, VM/370 has to compound its tables with those of MVS to make a third table having a single level mapping. These third tables are called "shadow page" tables and are illustrated in the following TABLE 3.

TABLE 3

| VM Shadow Page Tables | |
|---|---|
| MVS page tables { logical address ⋮ ⋮ pseudo physical address ⋮ ⋮ VM page tables ⋮ ⋮ physical address } | replaced by | { logical address ⋮ ⋮ VM shadow page tables ⋮ ⋮ physical address } |

When MVS is given control under VM/370, the shadow page tables are marked as invalid so that VM/370 receives an interruption on the first reference to each page.

VM/370 then compounds the maps for each page and inserts a valid accurate entry into the shadow table. This process causes the overhead.

A third major source of VMS overhead is that all interruptions must be received by VMS and checked, and then the interruption, if it is for the subservient SCP, must be processed by the subservient SCP resulting in a duplication of effort. This duplication applies particularly to supervisor call (SVC) interruptions caused by a job under the subservient SCP (always intended for that SCP) and to I/0 interruptions.

There are a number of approaches that have been utilized to overcome the VMS causes of overhead. One approach, the VM-Assist, is to change the host computer so that the VMS can do its job more efficiently. Another approach, the Hypervisor, is to essentially bypass operations in the VMS thereby making the VMS seem to do its job more efficiently.

VM-ASSIST

The VM-Assist approach has been followed in IBM Corporation products to improve the performance of VM/370 as the chief SCP. The VM-Assist has the hierarchy of TABLE 2 where VMS is VM/370 and MVS is a subservient production SCP. Some of the improvements have been as follows. The privileged mode in a subservient SCP, such as MVS operating under VM/370 is distinguished as a third mode of execution. In that mode, privileged instructions that cannot harm VM/370 are allowed to execute without interruption, or are modified so that restrictions are checked efficiently by microcode. Long complex pieces of VM/370 are placed into microcode to increase the speed of operation of VM/370. SVC interruptions from jobs under the subservient SCP MVS cause transfers directly to MVS. Microcode is used to build shadow page tables.

By means of these various techniques, the performance of MVS under VM/370 may be raised but in practice it is raised only to about seventy to eighty percent of native performance.

The mode control bits for VM-Assist are indicated in the following TABLE 4:

TABLE 4

VM-Assist Control Bits "P" and "V"

HYPERVISOR

The Hypervisor approach is used by Amdahl Corporation with its VM/PE product. Rather than placing an existing SCP in absolute control of the computer, a new SCP called a Hypervisor is introduced as the absolute master. The control hierarchy is as illustrated in TABLE 5.

TABLE 5

Control Hierarchy with the Hypervisor Approach

One SCP, for example MVS, is singled out as being the production SCP running under the Hypervisor. The Hypervisor architecture relies upon the option of VM/370 to allow a program under VM/370 to have its addresses set up so that logical (to VM) and physical addresses are the same (so-called V = R operation). The SCP for production, MVS, is set up so that the entire address space known by MVS is physical. VM/370 and the Hypervisor use physical sotrage higher in the address space than the MVS address space limit.

The sources of overhead in the Hypervisor are then dealt with as follows:

1. MVS runs in privileged mode and can execute all instructions.

2. The single level mapping set up by MVS is the only one needed because V = R.

3. All interruptions are received by the Hypervisor which quickly and efficiently decides whether to cause the interruption to be processed in VM/370 or in MVS. In this way, processing of the interruption is returned to a subservient SCP, either MVS or VM/370. Each I/O channel is assigned to either VM or to MVS (with no sharing) thus making the decision simple for I/O interruptions. The Hypervisor may also, in certain cases, set up the interrupt mechanism so that the SCP running receives some interruptions directly.

The Hypervisor approach allows the SCP MVS "under" the SCP VM/370 to execute in an improved manner, but in actual practice the improvement is only to about ninety to ninety-three percent of the performance of MVS native. The Hypervisor approach has some drawbacks. One drawback is that there is no protection of VM/370 from MVS. Another is that there is still about ten percent overhead Additionally, only one SCP may be for production, that is, execute efficiently enough to be acceptable for use in production Finally, the complexity of a full VMS (chief SCP) is introduced even if it is not needed. For example, running two copies of MVS still requires the full complexity of the VMS.

It is possible to combine the VM-Assist approach with the Hypervisor approach by imbedding the Hypervisor in VM. This combination can be expected to improve performance and, with the VM-Assist hardware, can ensure protection of VM I/O channels from MVS. Although the combination of the VM-Assist and Hypervisor approaches can be expected to improve somewhat, the overhead required will still be substantial Therefore, in accordance with the above background, there is a need for an improved architecture which permits multiple SCP's to be time-multiplexed in the same host computer while avoiding the overhead which is attendant prior art systems.

Additionally, there is a need for an improved computer system which permits multiple SCP's to be run in an environment of variant machines, particularly where the SCP's are run efficiently.

SUMMARY OF THE INVENTION

The present invention is a host computer which functions as one or more variant systems The host computer stores one or more system control programs, SCP's, where each SCP is provided for production operation of the host computer The host computer includes common control means for all of the SCP's for controlling the host computer The host computer also includes extended control means responsive to the one or more SCP's to make the host computer appear as one or more variant systems. The extended control means in the host computer ensures efficient operation of the host computer during production runs of each one or more of the SCP's.

The host computer consists of one or more Central Processing Units (CPUs or more generally processors), a plurality of input/output (I/0) channels, and a shared common main storage. Control signals between processors and channels pass through an interrupt router. The processors and I/0 channels include address mapping hardware. Also, monitoring hardware is present within each processor. The mapping hardware converts virtual addresses as generated by a program into physical addresses.

The host computer additionally includes a logical processor facility that allows the efficient concurrent operation of multiple system control programs, each system control program operating for production in an environment possibly variant from the host computer and possibly variant from other system control programs.

The host computer with the logical processor facility replaces multiple computer systems where each computer system is a different variant with its own different SCP. Control of the host computer and logical processor facility is performed by a Virtual Machine SCP called an Executive System Control Program (ESP). One or more SCP's are typically standard programs such as IBM's MVS and are unaltered by the logical processor facility.

The present invention achieves the objective of providing an improved computer system which permits multiple SCP's to be run efficiently in an environment of variant machines.

The foregoing and other objects, features and advantages of the invention will be apparent from the following more particular description of a preferred embodiment of the invention, as illustrated in the accompanying drawings.

DETAILED DESCRIPTION

FIG. 1

OVERALL SYSTEM

Figure 1:
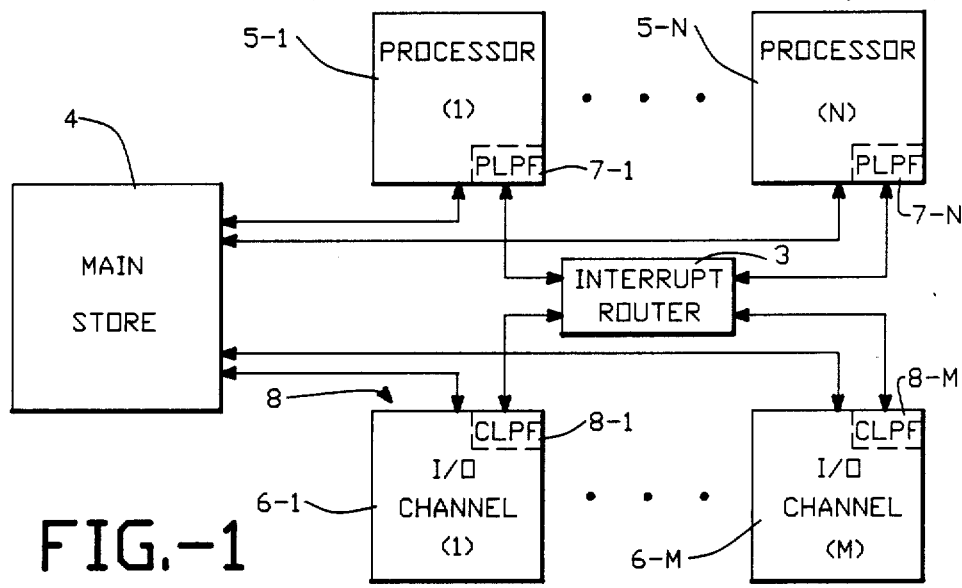
FIG. 1 is an overall block diagram of a computer system including the logical processor facility of the present invention.

In FIG. 1, a generalized computer is shown which includes one or more processors 5-1, . . . , 5-N and one or more input/output (I/O) channels 6-1 through 6-M. Each of the processors 5-1 through 5-N and each of the channels 6-1 through 6-M connect to the main store 4.

In FIG. 1, the processors and channels are to a large extent architecturally the same as conventional prior art computers such as the IBM System/370 and the Amdahl 470. Additionally, in FIG. 1, an additional architectural structure is included as part of a logical processor facility. Each of the processors 5-1 through 5-N include an additional structure 7-1 through 7-N, respectively, which is part of the logical processor facility.

Also, the channel units 6-1 through 6-M also include additional structures 8-1 through 8-M, respectively, which are part of the logical processor facility. An interrupt router 3 is provided for directing I/O interrupts from channel units 6-1 through 6-M to the appropriate one of the processors 5-1 through 5-N.

The FIG. 1 system, excluding the logical processor facility, functions in a conventional manner under any conventional system control program (SCP) for production operation carried out by the execution programs.

With the logical processor facility in the FIG. 1 system, a host computer is formed which can operate under control of instructions from a special chief system control program called "ESP". A typical subservient SCP, running under control of instructions from ESP is the well-known SCP called MVS.

The logical processor facility includes a number of mechanisms within the host computer. First, the host computer with the logical processor facility includes mechanisms that allow multiple system control programs (SCP's) to reside in the host computer under control of instructions from ESP ESP instructions function to control a part of the overall system of FIG. 1 while other SCP's control production operation.

Second, the host computer includes mechanisms that allow instructions from ESP to cause use of the host computer to be shared efficiently among the SCP's.

Third, the host computer includes mechanisms that allow instructions from ESP to make the host computer appear to be a variant to any one or more SCP's and to operate efficiently in production for each SCP.

FIG. 2

Main Store Domains

Figures 2, 3:
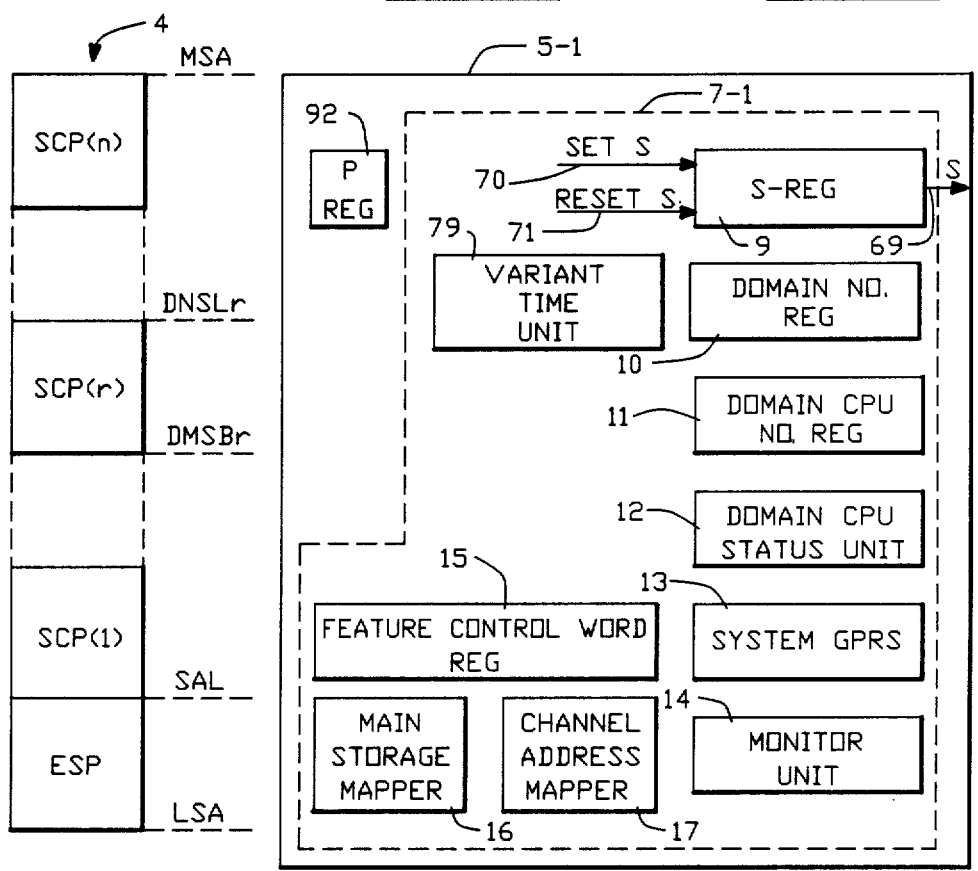
FIG. 2 is a block diagram of the main storage showing the allocation of main storage addresses to multiple system control programs (SCP's).
FIG. 3 is a block diagram showing further details of a processor and particularly the additional units which are added to form the logical processor facility.

In FIG. 2, an address allocation for the system control programs (SCP's) is shown The address allocation is between the lowest system address (LSA) and the maximum system address (MSA). For convenience, the chief SCP called ESP is located in the lowest region of main store between the lowest system address LSA and a system address limit (SAL). Of course, the ESP may have any location. The amount of storage allocated to ESP may be any size and in one example is 256K bytes In a similar manner, each one "r" of the "n" SCP's SCP(1), SCP(r), . . . , SCP(n) is allocated some block of main storage which is unique to that SCP. In a typical address scheme, each SCP has its block of main storage allocated in terms of a base address and an offset which when added to the base provides the upper limit for the range of addresses for that SCP. For example, a typical one of the SCP's is the SCP(r) which has a base address $DMSB_r$ and an upper address limit $DMSL_r$.

Each of the SCP's (that is for r equal to any of the values from 1, . . . , n) will have a corresponding DMSB and DMSL. In this way, the multiple SCP's including the ESP have separate address allocations in the main store 4 of FIG. 1. These separate allocations are called "domains". Each domain is identified by a domain number, "r".

CONTROL HIERARCHY

The control hierarchy includes a chief SCP, named the ESP, and a plurality of subservient SCP's, SCP , . . . , $SCP_r$, . . . , $SCP_n$. Each subservient SCP controls a number of application programs, called jobs. The control hierarchy is represented by the following TABLE 6.

TABLE 6

Control Hierarchy with Logical Processor Facility

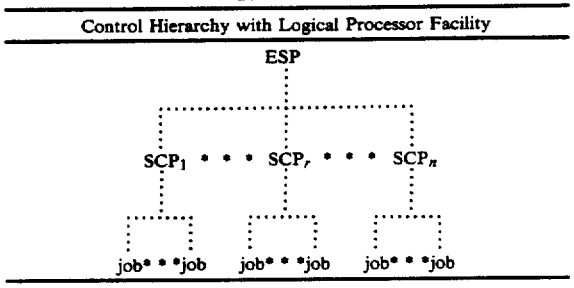

The control hierarchy of TABLE 6 appears to be similar to the control hierarchy of a VMS system, as given in TABLE 2, but the modes of operation are significantly different In this specification, the terms "modes" and "states" are used generally to refer to control conditions determined, for example, by the "1" or "0" conditions of one or more control bits.

The host computer of FIG. 1 with the logical processor facility has two states of operation, system state and user state for each processor 5-1, .., 5-N and for each channel 6-1, 6-M. In addition, both the system state and the user state have a supervisor mode and problem mode. The state, system or user, is defined by one or more system control bits, "S", in each processor and in each channel Similarly, the supervisor mode and the problem mode are defined by one or more mode control bits, "P".

When the system state is the one asserted (S=1), then the process or or channel is working for ESP. When the user state is the one asserted (S=0), the processor or channel is working for an SCP. The following TABLE 7 represents the control bit states.

TABLE 7

LPF Control Bits "S" and "P"

| | System (1) | | User (0) | |
|---|---|---|---|---|
| | . . . . . . . . . . . . . . S . . . . . . . . . . . . . | | | |
| Supervisor (0) | | Problem (1) | Supervisor (0) | Problem (1) |
| . . . . . . . . P . . . . . | | | . . . . . . . . P . . . . . | |
| ESP | | ESP' | SCP | JOB |

Transitions between user state and system state are achieved by a flip of the one or more state bits and occur by a number of means. For a channel, state bit transitions occur upon initiation of a channel program and channel programs are initiated on behalf of user state or system state. A channel program is initiated in a conventional manner with a START I/O instruction such as SIOF. For a processor, transitions from system state to user state occur on execution of a "changeover" instruction and transitions from user state to system state accompany the occurrence of interruptions.

System/370 instructions, whether in supervisor or problem mode, may be executed in either user state or system state without interruption. Some instructions, such as the "change-state" instructions, are only valid for execution in system state. ESP operating in system state executes the "change-state" instruction to return to user state before giving control to an SCP. It is unnecessary for ESP to receive control in order for an SCP to execute a privileged instruction.

The mode control bit, P, is used in both system state and in user state to indicate either a problem mode or a supervisor mode of operation The state control bit, S, is used to indicate either a system state or a user state in both the problem mode and the supervisor mode. The combined operation of the S and P bits provides a mechanism which permits variant operation. In both problem and supervisor mode under system state, each different variant, corresponding to a different SCP, can be accommodated Furthermore, the system state can include both a problem mode and a supervisor mode.

The efficiency of various SCP's running in a system of the FIG. 1 type can be determined relative to their performance running in native mode and not under supervision of a chief SCP such as ESP. In order to qualify with an acceptable level of performance for production operation, the performance of the SCP in the logical processor facility, under control of a chief SCP, generally must be at least 95% of native mode performance and desirably is greater than 99% of native mode performance.

For this reason, the logical processor facility is generally equipped with components which help ensure that the SCP's will be capable of running for production, that is, with a performance greater than 95% of native mode performance Different parts of the logical processor facility are hereinafter described to show how they interconnect with a conventional System/370 computer.

FIG. 3

Typical Processor

In FIG. 3, further details of a typical processor, such as processor 5-1 of FIG. 1, are shown. In FIG. 3, the processor 5-1 is a conventional System/370 processor which additionally includes the unit 7-1 which forms part of the logical processor facility. The unit 7-1 includes the S-register 9 which stores the state bit, S, for indicating whether the processor is in the user state or the system state.

The unit 7-1 includes a domain number register 10, for indicating which domain number "r" the processor 5-1 is allocated. The "domain" is the address range over which the SCP is authorized to operate as described in connection with FIG. 2. Each of the SCP's is represented in general by a different domain number. Where only a single SCP is employed, register 10 can be ignored. In general, each time a different SCP is given control of the processor 5-1 by the loading of a different domain number into register 10, the contents of all the other registers in the logical processor facility 7-1 are reloaded. The loading of the logical processor registers is under control of an instruction from ESP such as Load System Registers (LSR).

The unit 7-1 includes a domain CPU number register 11. The register 11 stores a number which uniquely identifies a processor which acts as one of the processors 5-1 through 5-N. In an embodiment where onlY a single processor, such as processor 5-1, is employed, the register 11 can be ignored. The number "N" designates the number of active processors allocated to the system. Any number, "X", of processors where X is greater than N can be connected in the system, but only a subset N of X will be defined as active at any one time The unit 7-1 includes a domain CPU status unit 12. The status unit 12 includes additional program status word (PSW) registers and other structure useful in the logical processor facility. The status unit 12 as part of the logical processor facility unit 7-1 is in addition to any status registers and circuitry which the processor 5-1 has for normal operation without a logical processor facility.

Unit 7-1 also includes a number, for example 16, of system general purpose registers 13. The system general purpose registers (GPR's) are in addition to the general purpose registers in the processor 5-1 as the processor 5-1 exists as a System/370 processor without the addition of the logical processor facility 7-1.

The monitor unit 14 is included for monitoring the operation of the host computer with the logical processor facility.

The unit 7-1 includes the main storage mapper 16 which assures that addressing by the processor 5-1 is to the appropriate locations in the main storage 4 as partitioned in the manner previously described in connection with FIG. 2.

The unit 7-1 includes a channel address mapper 17 which functions to ensure that addressing between the processor 5-1 and any one of the channels 6-1 through 6-M has the appropriate addressing.

The unit 7-1 includes a feature control word register 15 which identifies what features are activated in the processor 5-1.

The unit 7-1 includes a variant time unit 79 which permits each SCP to have a different time-of-day clock that has a different time than the time-of-day clock of the processor 5-1 when processor 5-1 is a System/370 processor without the logical processor facility of unit 7-1.

In system state, a processor, such as processor 5-1 of FIG. 3, may use the actual physical addresses (absolute addresses) of main storage and these addresses are termed "system main storage addresses". The range of addressing is limited, however, by a system address checker in the main storage mapper 16 to protect SCP's against errors in ESP.

In user-state, a processor, such as processor 5-1, sees effective addresses expected by the SCP, termed "domain main storage addresses", or more simply, "domain addresses". In system state, the processor sees effective addresses expected by the ESP termed "system main storage addresses", or more simply, "system addresses".

FIG. 4

Main Store Mapper

Figure 4:
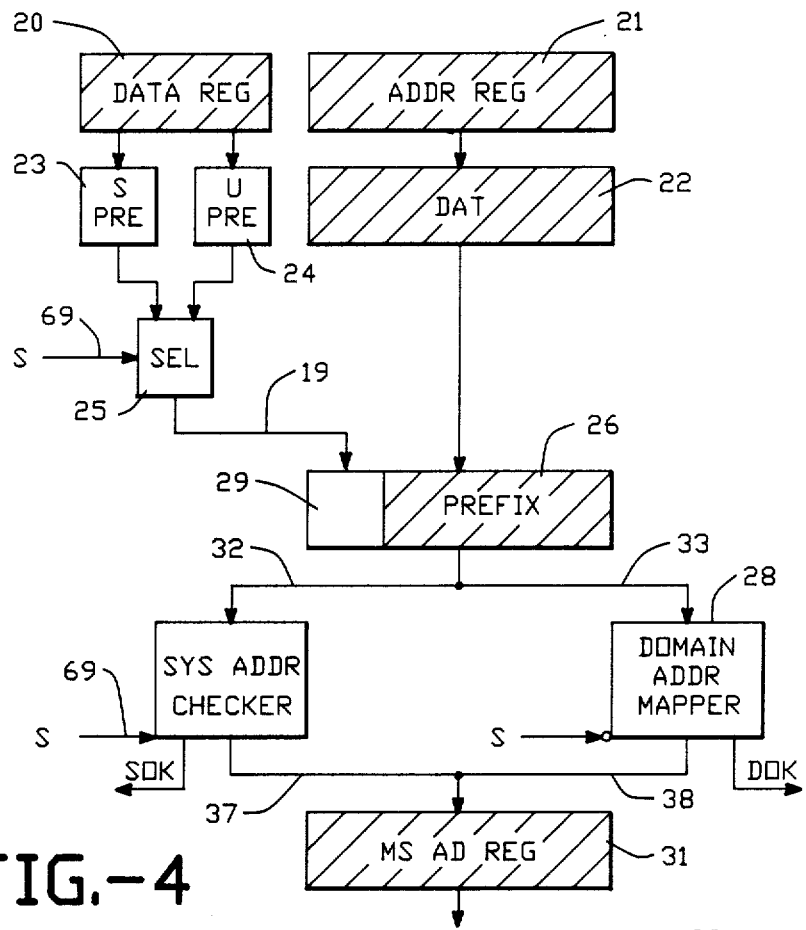
FIG. 4 is a block diagram which shows the main storage mapper unit in the FIG. 3 processor.

In FIG. 4, further details of the main storage mapper 16 as they appear in the processor of FIG. 3 are shown. In FIG. 4, the cross-hatched boxes form part of the conventional System/370 processor 5-1. The effective address register 21 provides an address to the dynamic address translation unit 22. The translated address from unit 22 provides an input to the prefix unit 26. The prefix unit 26 is conventional in accordance with System/370 architecture except for the high-order field portion 29. The high-order field portion 29 receives a prefix from the selection unit 25. Selection unit 25 selects either a user prefix from a user prefix register 24 or a system prefix from a system prefix register 23. The system and user prefix registers 23 and 24 are loaded from a data register 20, under program control during initialization by processor 5-1. Data register 20 can be the main store data register 49 or any other data register in a conventional System/370 processor. The loading of registers 23 and 24 is typically performed by executing an ESP instruction Load System Register (LSR).

The selection of the prefixes from registers 23 and 24 is under control of the system bit, S. When S is a logical 1, then the system prefix from register 23 is selected and when the system bit is a logical 0, the prefix from the register 24 is selected. With the appropriate prefixing applied to the address, the addresses are input to the system address checker 27 and the domain address mapper 28. The system address checker checks to determine that any system address does not exceed the system address limit, SAL. The domain address mapper 28 checks to determine that any user address for a particular SCP is within that SCP's address range. The output from the address checker 27 or the mapper 28 is stored within the address register 31 used for addressing the main store 4 of FIG. 1.

Since the FIG. 1 system contemplates a multiprocessor environment (more than one processor), a separate high-order processor prefixing mechanism (registers 23 and 24 and selector 25) is provided in FIG. 4 for system addresses and for domain addresses. There is a different prefix mapper for domain addressing and for system addressing because the prefix mapping used by the SCP may not be suitable for ESP and, additionally, because it is desirable to allow different SCP's to have different prefixes.

Other than for the high-order prefixing, the prefix mapping is a duplicate of the well-known System/370 mapping.

FIG. 5

System Address Checker

Figures 5, 6:
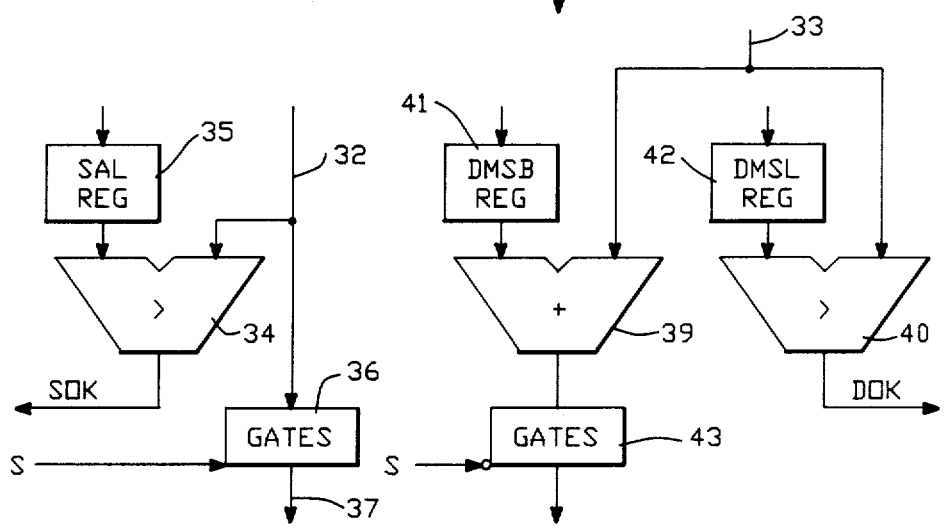
FIG. 5 is a block diagram of the system address checker used in the FIG. 4 unit.
FIG. 6 is a block diagram of the domain address mapper used in the FIG. 4 unit.

In FIG. 5, a typical example of the system address checker 27 of FIG. 4 is shown in greater detail. The bus 32 from the prefix unit 26 connects as one input to a comparator 34. The comparator 34 compares the address on bus 32 with the address from the SAL register 35. If the register 35 contents is greater than the address on bus 32, then the SOK signal is a logical 1 indicating that the system address is within the permitted ranges of addresses for the ESP as previously indicated in connection with FIG. 2. If SOK is a logical 0, then the interrupt control 68 of FIG. 9 will cause an interrupt to be taken. Gates 36 gate the address on bus 32 as an input to the register 31 of FIG. 4 if the system bit S is a logical 1.

The SAL register 35 is loaded with the SAL address from any data register, such as the data register 20 of FIG. 4, during the initialization of the system. Register 35 is loaded, for example, by execution of a Load System Register (LSR) instruction.

FIG. 6

Domain Address Mapper

In FIG. 6, further details of the domain address mapper 28 are shown. The address from the prefix unit 26 provides an input to the adder 39 and to the comparator 40. The adder 39 adds the address to the base address in the DMSB register The base address in the register 41 is provided during initialization whenever an SCP is the one which is in control of the system for production. The correct base address for any SCP is loaded into the register 41 during initialization, for example, by an LSR instruction. During operation, the base address is added to all addresses on bus 33 for that SCP. The address on bus 33 when added to the quantity in the base register 41 normally cannot exceed the domain system limit address, DMSL. In order that the DMSL address is not exceeded, the value of the offset increment on bus 33 is checked in the comparator 40. If the address on bus 33 is less than the quantity in the DMSL register 42, comparator 40 provides the DOK signal as a logical 1. If the address on bus 33 exceeds the DMSL quantity, then the DOK signal is a logical 0 indicating that the address limit has been exceeded and causes an interrupt to be taken.

The DMSL register 42 is loaded from a data register, similar to the data register 20 in FIG. 4, at the time of initialization of an SCP as the production SCP within the processor 5-1. The loading is by a LSR instruction.

The checker 27 and mapper 28 of FIGS. 4, 5, and 6 are in addition to the existing SCP maps implemented in a conventional System/370 system by the dynamic address translation (DAT) unit 22. This second mapping is a significant change from VM-assist which uses only one mechanism for translations.

The new mappings are controlled by extra instructions valid only in system-state. Load System Registers (LSR) is a typical instruction for loading the system registers in the FIGS. 4, 5 and 6 structures.

By means of the above maps, main storage 4 in a computer with a logical processor facility is shared so that ESP occupies and may address with system addresses the lowest portion of main storage. The other SCP's are typically allocated non-overlapping, contiguous, and higher sections of system main storage for their residence and use. ESP is considerably simplified by this mechanism. Rather than being involved with main storage mapping for each SCP, the ESP merely loads the system registers in FIGS. 4 and 6 thereby controlling the parameters of the mapping which are appropriate to an SCP before that SCP is given control.

CHANNELS

In the computer of FIG. 1, different SCP's can share the system's channels and use channel addresses without conflict.

ESP and the SCP's may all initiate I/O operations by executing a System/370 I/O instruction (such as SIOF) containing a channel address. The addressed channel is informed of the status of the processor when the operation is initiated, including the state of the processor and the contents of main storage address mapper registers. A channel initiated in user state maps in the manner set up in the processor at initiation of the SCP. An operation initiated in system state may use system main storage addresses or domain main storage addresses depending on the operation.

An interruption, signifying completion of an I/O operation under control of the interrupt router 3, is only received by a processor acting on behalf of the initiator of the channel operation, thus reducing redirecting overheads in ESP. ESP is not required to intervene to direct or control conventional System/370 I/O interrupts.

To ensure that ESP and an SCP can use the same channel addresses without conflict, the channel addresses used in user-state are distinguished as domain channel addresses and are mapped to system channel addresses using a new channel address mapper which forms part of the logical processor facility. The system channel addresses may be used directly by ESP.

FIG. 7

Channel Address Mapper

Figure 7:
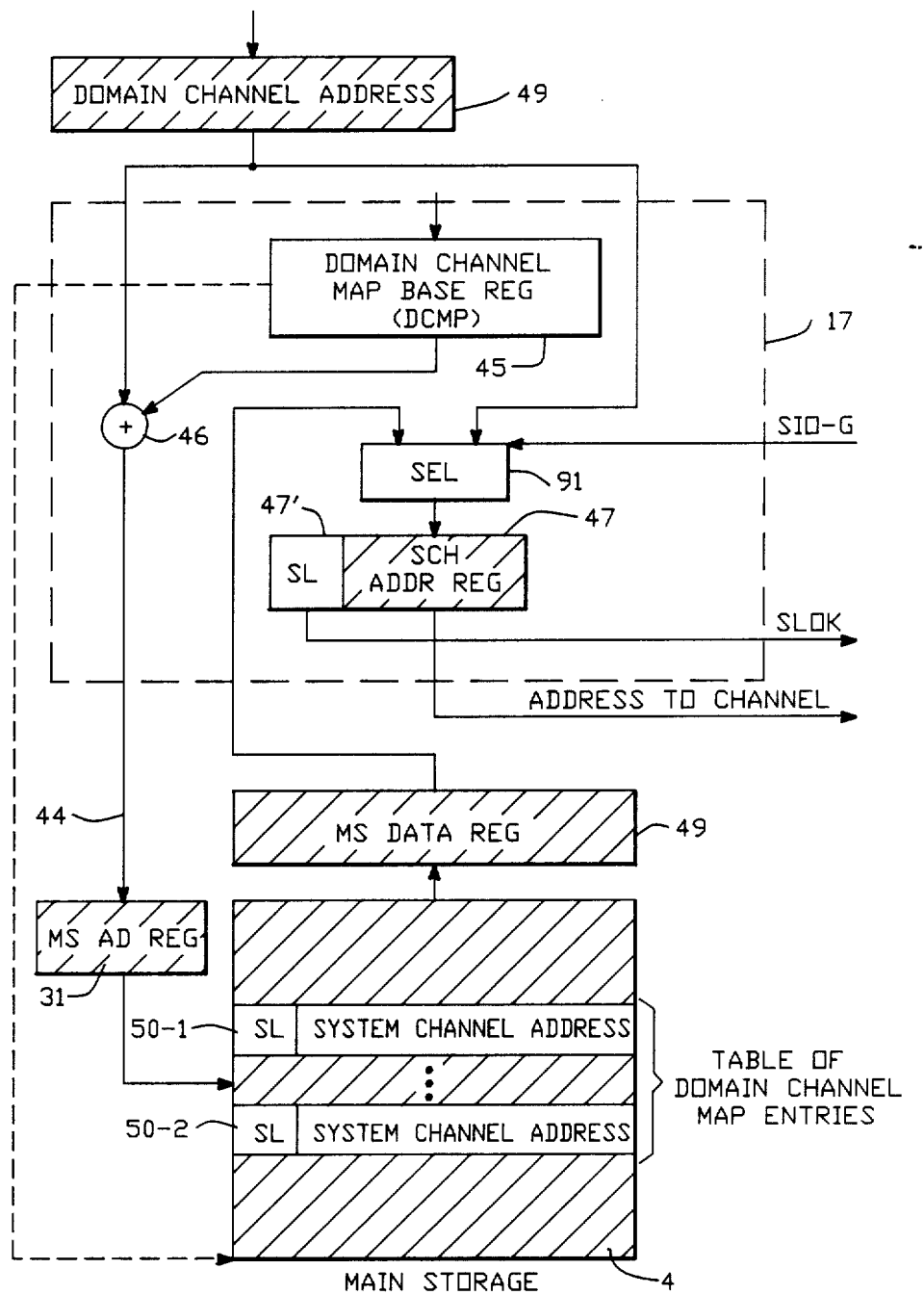
FIG. 7 is a block diagram of the channel address mapper.

In FIG. 7, the channel address mapper 17 of FIG. 3 is shown in further detail. The mapper includes a domain channel map base register 45, an adder 46 and a channel address register 47 with a lock field (SL) 47'. Whenever a channel is to be addressed by the processor 5-1, the processor 5-1 in accordance with the System/370 architecture in response to a START I/O instruction generates a channel address which, to distinguish it from a system channel address, is denoted the domain channel address. The domain channel address is stored in the register 48 in FIG. 7. Register 48 is a conventional System/370 register. The adder 46 adds the base address from register 45 to the domain channel address from address register 48. The output from adder 46 is stored in the memory address register 31 for addressing the main store to obtain one of the domain channel map entries from a table 50 of such entries in the main store 4 of FIG. 1. The system channel address from the main store 4 is stored in the main store data register 49 where it can be selected by selector 91 for latching into the system channel address register 47 in the channel address mapper 17.

Selector 91 also receives the direct input from register 48. Selector 9, in response to the SIO-G signal, selects either the address from register 48 in system state or the address from register 49 in user state. The SIO-G signal is provided by sequencer 66 in response to a decoded START I/O instruction. SIO-G is asserted in system state to select register 48 contents and not asserted in user state to select register 49 contents.

Each entry in the main storage table of the domain channel map entries includes a system lock bit 50 which is accessed together with a system channel address for storage in the system channel address register 47.

The system lock bit, SL, provides the SLOK signal in an asserted state if access to the channel is to be restricted to the system state. If the SL bit is not asserted, then the SCP is permitted to have access to the channel. Note that the SL bit restricts or permits access to the channel without restricting the range of addresses which can be used by the SCP. If SLOK is asserted and an access is attempted in user state, then interrupt control 68 in FIG. 9 causes an interrupt to be taken.

After setting up the channel maps in the ESP region of main storage, ESP need only load the pointer register 45 before giving control to a SCP. ESP does not need to get involved with normal SCP I/O operations at all. ESP loads register 45 using an LSR instruction.

With the above hardware extensions for a logical processor facility, multiple SCP's including a controlling ESP can share the resources of a single host computer. The different SCP's are differentiated by different address mappings. The mechanisms of the logical processor facility are useful whether there is one SCP or many and they help achieve efficiency of the SCP's, especially for production.

The host computer of FIG. 1 has one or more processors capable of time-multiplexed operation of multiple SCP's each processor identifying the current SCP in control by a domain number contained in register 10 in the processor of FIG. 3 and identifying the current processor in the SCP by a number in register 11. For a multiprocessor SCP any processor can be acting as any processor controlled by the SCP. In the logical processor facility, the SCP and the SCP's processor are specified as the domain number in register 10 and domain CPU number in register 12. These identifications are used in I/O operations.

CHANNEL UNIT LOGICAL PROCESSOR FACILITY

Each of the channel units 6-1 through 6-M includes the additional structures 8-1 through 8-M which form a part of the logical processor facility.

Each of the structures includes registers for storing one or more copies of the contents of the system register 9, the domain number register 10 and the domain CPU number register 11 as previously described in connection with FIG. 3. At a time that one of the I/O channels 6-1 through 6-M receives a task from one of the processors 5-1 through 5-N, the contents of the registers 9, 10 and 11 in the processor are copied into the corresponding registers in the I/O channel.

The structures 8-1 through 8-M also each include a main storage mapper 16, like that shown in FIG. 3 and in further detail in FIG. 5 and FIG. 6. With the main storage mapper, each channel is able to perform the address checking and address mapping to ensure that the channel program makes the accesses to the correct main storage domain.

At the time that a copy of the contents of registers 9, 10 and 11 of FIG. 3 from one processor are stored into corresponding registers within a structure 8 of an I/O channel, the contents of the SAL register 35, the DMSB register 41 and the DMSL register 42 are also copied into corresponding registers within the I/O channel.

The copying of the contents from the logical processor facility registers in a processor into the corresponding registers of a channel occurs, for example, as a part of the decode of a START I/O instruction.

Figure 11:
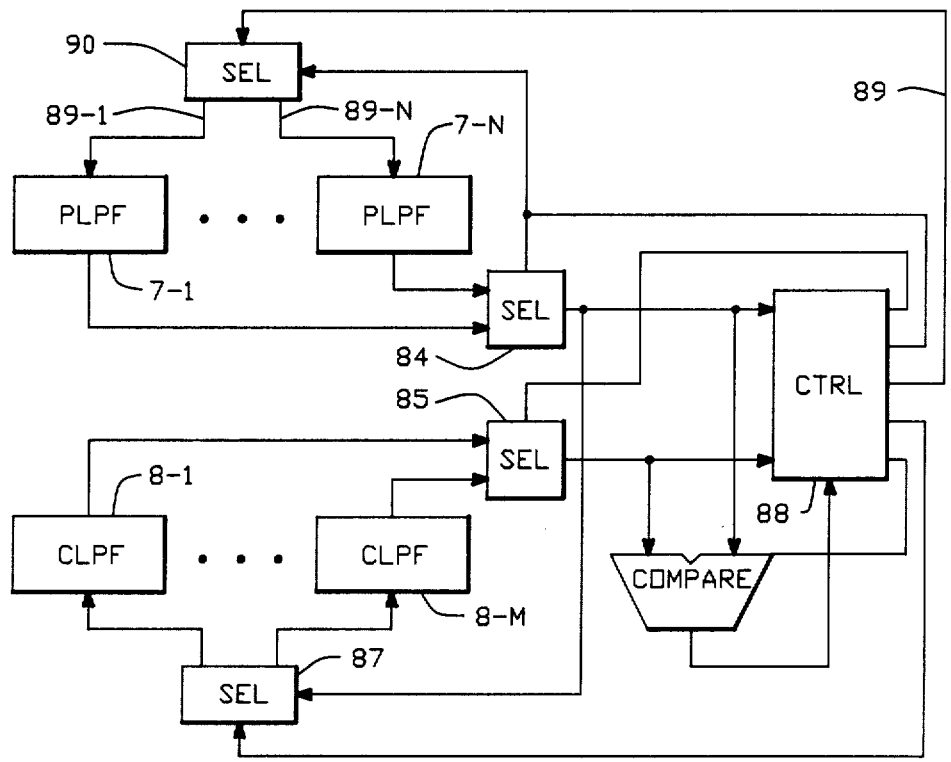
FIG. 11 is a block diagram of the interrupt router of FIG. 1.

The operation of the channel either for an I/O program in system state or in user state is carried out with the address mapping in the channel in the same manner as occurred in the processor as described in connection with FIG. 5 and FIG. 6. At the completion of an I/O operation, an I/O interrupt is generated by the channel in a conventional manner as occurs for System/370 computers. The I/O interrupt is additionally, however, directed by the interrupt router 3 of FIG. 1 back to the processor which has the same domain number and domain CPU number as were stored in the corresponding registers in the channel structure 8. As shown in FIG. 11, the interrupt router compares the domain number and the domain CPU number from the channel and from the processor and if they match, will direct the I/O interrupt to the processor.

The interrupt router will transfer the I/O interrupt as a function of the system state bits of the processors and the channel. Any logical combination for determining the transfer can be employed. For example, if both the processor and the channel are in user state (S=0) then the I/O interrupt will be transferred and processed by the processor as a normal user state interrupt. If the channel is in the user state (S=0) and the processor is in the system state (S=1), then the router 3 will not transfer the interrupt until the processor 5-1 returns to the user state for the same domain number. Any set of rules can be adopted for determining when and how the I/O interrupt is to be transferred and processed by the processor.

FIG. 11

Interrupt Router

In FIG. 11, further details of the interrupt router 3 of FIG. 1 are shown. Specifically, the logical processor facilities 7-1 through 7-N of the processors 5-1 through 5-N are shown in FIG. 11. Similarly, the logical processor facilities 8-1 through 8-N of the channels 6-1 through 6-M are shown in FIG. 11. The register and other information output from each of the units 7-1 through 7-N are input to a selector 84 which operates to select one of the N outputs any time. Similarly, the outputs from the units 8-1 through 8-M connect to the selector 85 which in turn selects one of the M outputs. Control 88, in a conventional manner, controls selector 85 to determine if an I/O interrupt has been asserted. If asserted, control 88 compares the domain number from the channel with the active I/O interrupt line with the domain number register 10 in the processor identified in the domain CPU number register as controlled by selector 84. If the domains are the same, then the control 88 will forward the interrupt on line 89 through the selection gate 90 to the appropriate one of the processors 7-1 through 7-N. The appropriate processor selected by gate 90 is the same processor whose output was selected by gate 84 to provide an input to comparator 86 to determine that the domain numbers matched. Control 88 through selection gates 84 and 85 receives the state, system or user, from both the selected I/O channel by selection gate 85 and the processor by selection gate 84 as inputs to control 88. Even though the domains match, control 88 may or may not forward the I/O interrupt on line 89 as a function of the logical state, system or user, of both the processor and the I/O channel. Any logical combination can control the forwarding of interrupts.

In FIG. 11, the selection gate 87 is controlled by controller 88 to load the logical processor information from one of the processors into a selected one of the channel structures 8-1 through 8-M.

All of the special registers used by the logical processor facility are grouped together as the system register array. Instructions, such as Load System Register (LSR) valid only in system state, are provided to load and store the system registers thus providing the mechanism for switching a CPU between SCP's or between CPUs when one SCP is in control.

ESP loads the system registers before giving control to an SCP.

Figure 8:
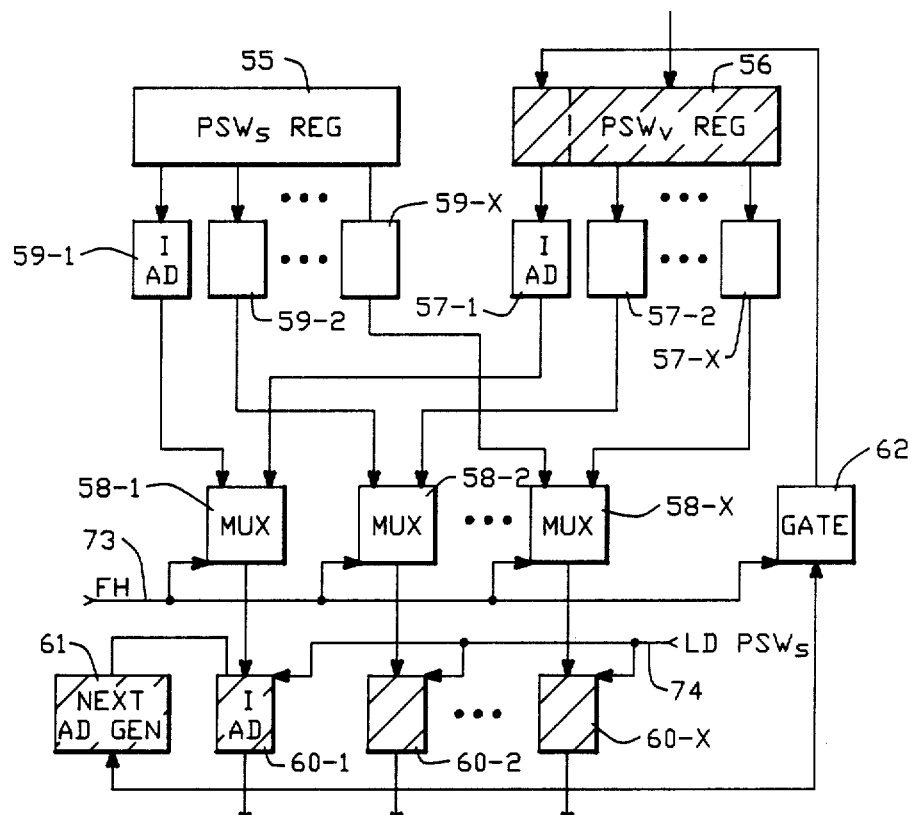
FIG. 8 depicts a block diagram of a status unit within the FIG. 4 unit.

FIG. 8
Status Unit

In FIG. 8, portions of the status unit utilized in connection with the present invention are shown. In a conventional System/370 data processing system, such as the AMDAHL 470 system, status information is contained in a program status word (PSW). In FIG. 8, the PSW is stored in the register 56. In order to indicate that the PSW in register 56 is the conventional one associated with a user, the subscript u is employed. PSWu designates the program status word employed by the system in normal user mode.

An additional program status word for use when the system is operating in system mode is designated as PSWs.

In FIG. 8, the $PSW_u$ from register 56 is normally distributed to user locations 60-1, 60-2, ..., 60-x. The register 56 and the user unit 60-1 through 60-x are shown cross-hatched to indicate that this is the normal connection in a system which does not have the logical processor facility of the present invention.

In FIG. 8, the output from the $PSW_u$ register 56 connects to individual registers 57-1, 57-2, ..., 57-x, which are locations distributed throughout the processor 5-1 of FIG. 1. These registers 57-1 through 57-x provide a distributed copy of the contents of register 56. The outputs from registers 57-1, 57-2, 57-x provide inputs to the two-input multiplexers 58-1, 58-2, 58-x, respectively.

The other inputs to the multiplexers 58-1 through 58-x are derived from the local $PSW_s$ generators 59-1, 59-2, 59-x. The PS generators 59-1 through 59-x provide the $PSW_s$ information to the multiplexers 58-1 through 58-x.

Multiplexers 58-1 through 58-x function to select the $PSW_u$ information for gating to the units 60-1 through u 60-x whenever the fast assist, FA, signal on line 73 is not asserted When the FA signal is asserted, then the PS information is gated to the units 60-1 through 60-x. In FIG. 8, the unit 60-1 holds the current instruction address which is to be executed by the FIG. 1 system. During operation, the instruction address in register 60-1 is incremented to the next address by a next address generator 61.

The first address in the register 60-1 is loaded from the PSW register 56. After the first address, the next address generator 61 provides the subsequent addresses into the register 60-1. This process continues during user mode in a conventional System/370 type of operation.

Whenever the program status word must be treated as data, such as when the system is switched from user mode to system mode, the then current instruction address in register 60-1 are gated by gate 62 for storage back into the register 56. The contents of register 56-1 are distributed to register 57-1.

In FIG. 8, assertion of the FA signal causes the $PSW_s$ information, including a new instruction address, to be selected for storage in the registers 60-1 through 60-x provided that the load signal LD $PSW_s$ on line 74 has been asserted.

The address in the register 60-1 causes an instruction to be fetched from the main store address When the PS provides the address, then the address should be for an instruction from one of the SCP domains as discussed in connection with FIG. 2. When PSWs provides the information address, then the address should be for an instruction within the ESP range of main storage addresses FIG. 9
Instruction Sequencing Apparatus In FIG. 9, further details of the instruction sequencing apparatus are shown Instructions fetched from main storage, at addresses specified by register 60-1 of FIG. 8, are stored in an instruction register 64. From register 64, instructions are decoded in a decoder 65. Conventional System/370 instructions, which can be processed by decoder 65 directly, are distributed to an instruction sequencer 66 Instruction sequencer 66 causes the instruction to be executed in a conventional manner. Other instructions, for example instructions not within the System/370 instruction set cannot be decoded directly by sequencer 66. Such instructions are recognized by decoder 65 and cause an exception instruction, EI, signal to be asserted on line 75. If the system is in the user mode, that is, the S bit is not asserted, then the EI signal causes the fast assist unit 67 to be activated If the EI signal on line 75 is asserted while the system is in the system mode, then the interrupt control 68 takes some appropriate action. For example, the interrupt control 68 may signify that a program exception exists and that the current instruction is not permitted in the system. The interrupt control 68 is in part, a conventional device in any System/370.

Additionally, interrupt control 68 includes an extended section 68' which is responsive to an interrupt router signal on line 51 to cause an interrupt of the processor. The extended section 68' of the interrupt control 68 includes conventional logic circuitry responsive to the S and P control bits and the interrupt signals on lines 51 (DOK, SOK, SLOK and 89-1) and any other control signals desired. For example, the extended section 68' may be implemented as programmable array logic. In a typical example, if the processor is in system state (S=1) at a time when an interrupt on line 89-1 occurs, the extended section 68' will cause the outputs on line 70 to be asserted in the same manner as when a fast assist occurs. In this manner, the conventional interrupt control 68, by operation of the extended section 68', will cause the system to transfer to system state if the I/O channel caused the interrupt from the system state. On the other hand, if the interrupt on lines 51 was caused from a channel operating in the user state, then the interrupt control 68 does not cause a switch to the system state, but causes an interrupt to be taken in a conventional manner. Accordingly, a channel, such as channel 6-1, can cause an interrupt to a processor, such as processor 5-1 without any requirement of switching from user to system state.

When in the user mode, the fast assist unit 67 causes the system to switch from the user mode to the system mode by asserting the SET S signal on line 70. Also the fast assist unit 67 asserts the FA signal on line 73 to cause the fast assist facility to be activated. The FA signal selects the $PSW_s$ in FIG. 8 as previously described. The unit 67 also asserts the LD PSW signal on line 74 which loads the appropriate PSW output from multiplexer 58 into the registers 60-1 through 60-x of FIG. 8.

In the manner described, the system upon recognition of certain instructions in instruction register 64 changes from the user mode to the system mode. In the system mode, instructions are executed based upon the sequence designated by the instruction at the address specified by the PS After that sequence is executed, the fast assist signal is reset by the RESET FA signal from sequencer 66. Also, the RESET S signal from sequencer 66 switches the system back to the user mode.

After the system in system state has processed the exception instruction which caused the transfer to system mode, the system returns to user mode at the point in the instruction stream just after that exception instruction.

Operation

"Release Local Lock" Program Example

An example of the operation of the present invention is given in connection with execution of an instruction stream including an instruction "Release Local Lock," designated as "SSE". In the example, the system is executing an instruction stream including instructions I1, I2, I3 and I4. After I4 is executed, the SSE instruction is fetched, but cannot be executed in user mode. The execution of SSE in system mode for an exemplary emulation for the case when the lock holds is indicated in the following TABLE 8. The instruction stream for the case when the lock does not hold is not shown in TABLE 8.

TABLE 8

| STMT | | |
|---|---|---|
| | * | USER STATE |
| 1 | I1 | |
| 2 | I2 | |
| 3 | I3 | |
| 4 | I4 | |
| 5 | SSE | * Release Local Lock, cannot be executed in user state |
| * | FAST ASSIST ENTRY, Set System State (S=1) | |
| * | Load System GPR Registers: | |
| * | R4 = DOMAIN EFFECTIVE ADDRESS OF | |
| * | 1st OPERAND OF INSTRUCTION | |

TABLE 8-continued

| | | | | |
|---|---|---|---|---|
| * | R5 = | DOMAIN EFFECTIVE ADDRESS OF 2nd OPERAND OF INSTRUCTION | | |
| * | R6 = | LEFT HALF OF $PSW_u$ | | |
| * | R7 = | NEXT SEQUENTIAL INSTRUCTION ADDRESS | | |
| * | R8 = | SAME AS R6 | | |
| * | R9 = | ADDRESS OF CURRENT INSTRUCTION (SSE) | | |
| * | SYSTEM STATE | | | |
| * | RELEASE LOCAL LOCK IF: | | | |
| * | (1) LOCAL LOCK IS HELD | | | |
| * | (2) CMS LOCK IS NOT HELD | | | |
| * | (3) LOCAL LOCK SUSPEND QUEUE IS EMPTY, | | | |
| 6 | TMD | 3(R5),PSALCLLI | * | IS THE LOCAL LOCK HELD |
| 7 | BNO | NOTHELD | * | NO, SKIP |
| 8 | TMD | 3(R5),PSACMSLI | * | CMS LOCK HELD |
| 9 | BO | NOTHELD | * | YES, SKIP |
| 10 | LSD | R14,0(,R4) | * | POINT TO ASCB |
| 11 | LSD | R0,ASCBLOCK (,R14) | * | GET LOCAL LOCK |
| 12 | XR | R1,R1 | * | SUSPEND QUEUE HEADER MUST BE EMPTY |
| 13 | XR | R2,R2 | * | ASCBLOCK |
| 14 | XR | R3,R3 | * | UPDATE ASCBLSQH TO ZEROES |
| 15 | CDSD | R0,R2,ASCBLOCK (R14) | * | ATTEMPT TO RELEASE THE LOCAL LOCK |
| 16 | BNE | NOTHELD | * | LEAVE IF QUEUE IS NOT EMPTY |
| * | IF THE LOCAL LOCK IS RELEASED, UPDATE: | | | |
| * | (1) User GPR R13 with 0's | | | |
| * | (2) PSAHLHI/BIT 31 to 0 | | | |
| * | AND RETURN TO USER STATE | | | |
| 17 | LTRUS | R13,R2 | * | SET USER GPR R13 TO 0 |
| 18 | NID | 3(R5),ALLBITS-PSALCLLI | * | SET BIT31 OF PSAHLHI TO 0 |
| 19 | RUS | (R7) | * | RESUME USER STATE, (RESET S=0), Load I Reg with instruction fetched from address specified by system GPR 7 |
| | * | USER STATE | | |
| 20 | I20 | | | |

In TABLE 8, the SSE instruction in statement 5 cannot be executed in the user state (S=0) and hence a fast assist entry is made. Decoder 65 in FIG. 8 recognizes the operation code field from the instruction register 64 and provides an output on the exception line 75 in response to the SSE instruction. With line 75 asserted, and with the System line 69 not asserted as a logical 0, the fast assist unit 67 is energized. The unit 67, in response to the asserted inputs on line 69 and 75 asserts an output on line 70 to set the system state (S=1).

Figure 9:
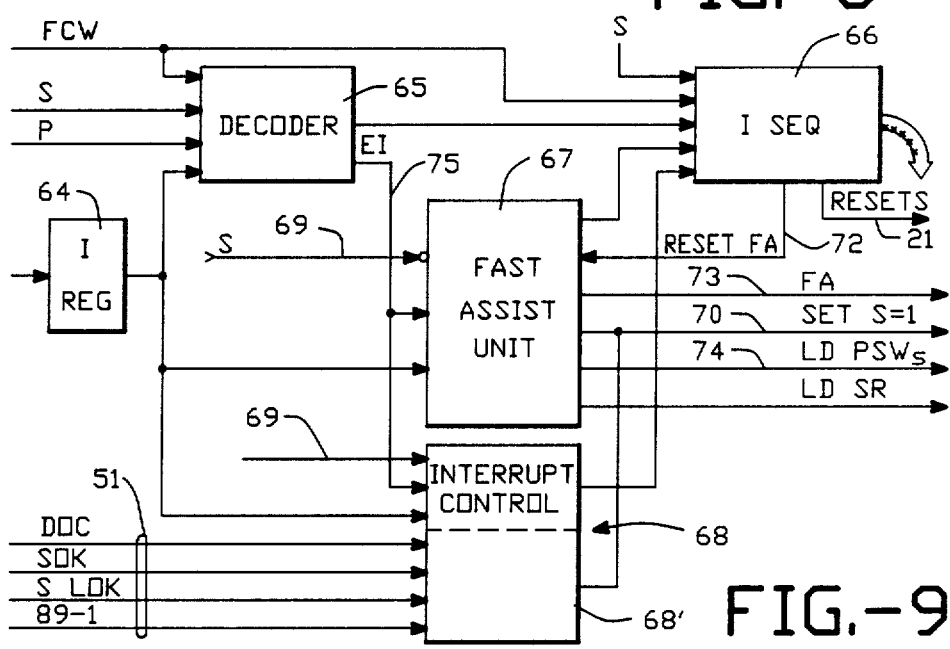
FIG. 9 is a block diagram of the instruction sequencing unit used in conjunction with the logical processor facility.

The contents of the general purpose system registers, SR4, SR5, ... SR9, are shown in TABLE 8. The statements 6 through 14 each contain a conventional instruction which when executed are the functional equivalent of the SSE instruction which could not be executed directly. In statement 15, the attempt to release the local lock is made. If the local lock is released, certain updates are made until in statement 20 the RUS instruction causes the computer system to return to the user state (S=0). In FIG. 9, the RUS instruction is in the instruction register 64 and is decoded by the decoder 65. The decoded output from decoder 65 is input to the sequencer 66. In response to the decoded output for the RUS instruction, the sequencer 66 asserts the RESET S line 21 to set S equal to 0.

In the user state, the computer system can then continue by executing instruction I20 which is the next instruction in this program which appeared after the SSE instruction in statement 5.

In the example of TABLE 8, an instruction, SSE, which could not be executed in the user state was executed in the system state and the return from the system state was to the next instruction (I21) which is the instruction after the instruction (SSE). The instructions in the statements 6 through 20 are executed in system state and are transparent to the user program.

The program including the instruction stream I1, I2, I3, I4, SSE, and I20 was intended to operate on a variant computer which had a facility for executing an SSE instruction. Even though the host computer did not have a facility for directly executing the SSE instruction, the logical processor facility enabled the host computer to appear like the variant and to actually execute the instruction stream, including the SSE instruction.

In TABLE 8, the instruction RUS is one of the instructions which can only be executed in system state (S=1). If the RUS instruction in register 64 of FIG. 9 appeared when the system was in the user state, the S=0 input to decoder 65 would cause the exception line 75 to be asserted. The fast assist unit 67 would cause the system state to be entered and would cause a program exception condition to be indicated.

Figure 10:
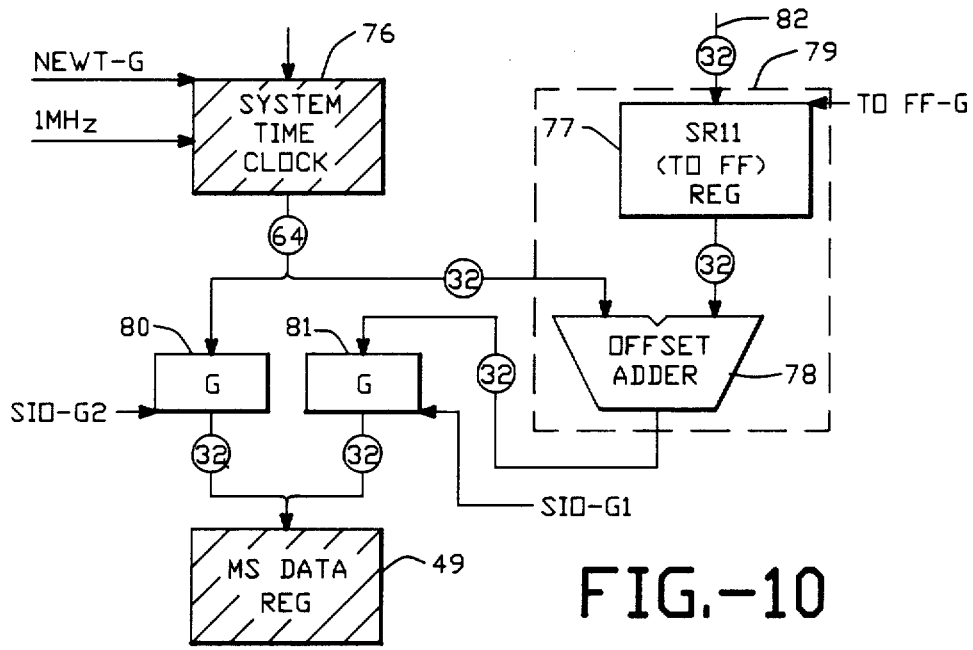
FIG. 10 is a block diagram of the clock unit used with the logical processor facility.

FIG. 10
system Time Unit

In FIG. 10, the system time unit, sometimes called the time-of-day clock, is shown. The system time unit includes a system time clock 76 which is, for example, a 64-bit counter stepped by a constant one MHz clock signal at bit position 51 to increment the high-order 52 bits. The time stored in the clock 76 is referred to as the System Time. During program execution, the time in the clock 76 is stored in memory under control of the Store Clock (STCK) instruction. A decode of the STCK instruction occurs, when that instruction appears in the instruction register 64 of FIG. 9. Decoder 65 senses the STCK instruction and causes the sequencer 66 to assert the gate signals (STC-G2 and STC-G1) to the gates 80 and 81. Gates 80 and 81 gate the System Time from the clock 76 to the main store data register 49 unless the time is modified in variant time unit 79. When no modification occurs, the operation is conventional and the same as for any System/370 computer. In the present invention, the variant time unit 79 is part of the logical processor facility 7-1 of FIG. 3 and provides the ability to have different times.

In FIG. 10, one embodiment of the variant time unit 79 is shown. Unit 79 includes an offset adder 78 which adds the high-order 32 bits from the System Time clock 76 to a time offset (TOFF) in register 77. The output from the adder 78 connects through gate 81 to the main store data register 49. Accordingly, the time which is loaded into the data register 49 is either the System Time directly from the clock 76 if the offset in register 77 is 0 or is the Variant Time differing from the System Time by the amount of the offset in register 77. The amount of the variant time offset (TOFF) stored in the register 77 differs from variant to variant. The offset quantity is stored in register 77 under the control signal TOFF-G which is generated by the sequencer 66 in response to a Set Clock (SCK) instruction. The SCK instruction is executed differently depending upon the computer's state, System or User.

Operation "Set Clock" and "Store Clock" Program Example

An example of a program (stream of instructions) which includes both the STCK and the SCK instructions is shown in the following TABLE 9:

TABLE 9

| STMT | | | | |
|---|---|---|---|---|
| | * | SYSTEM STATE | | |
| 1 | | I1 | | |
| 2 | | LSR New SR, SO, S15 | * | Load System Registers, loads, the LPF registers with SAL, DMSB, DMSL, DCMP for particular SCP from ESP. |
| 3 | | I3 | | |
| 4 | | I4 | | |
| 5 | | SCK NEWT$_s$ | * | Set Clock, (1) If System State (S=1) and Supervisor Mode (P=0), execute set clock directly; (2) If System State (S=1) and Problem Mode (P=1), a program interruption is caused; For S=1, P=0, SCIT fetches the New Time from main store location NEWT into clock 76. |
| 6 | | LPSWR LPBPSW | * | Load PSW Return, Reset S=0, Give Control to SCP |
| | * | USER STATE | | |
| 7 | | I7 | | |
| 8 | | I8 | | |
| 9 | | I9 | | |
| 10 | | SCK NEWT$_u$ | * | Set Clock; If User State (S=0), enter Fast Assist |
| | * | FAST ASSIST ENTRY, Set System State (S=1) | | |
| | * | Load System GPR's Registers: | | |
| | * | R4 = | DOMAIN EFFECTIVE ADDRESS OF 1st OPERAND OF INSTRUCTION (NEWT$_u$) | |
| | * | R6 = | LEFT HALF OF PSW$_u$ | |
| | * | R7 = | NEXT SEQUENTIAL INSTRUCTION ADDRESS | |
| | * | R8 = | SAME AS R6 | |
| | * | R9 = | ADDRESS OF CURRENT INSTRUCTION (SCK) | |
| | * | SYSTEM STATE | | |
| 11 | N | R6, LPBPSWN | * | Is it from Problem or Supervisor Mode |
| 12 | BNZ | PRIV | * | If Problem Mode, branch to PRIV |
| 13 | LSD | R0, 0 (,R4) | * | Load R0 with New Time from NEWT$_u$ |
| 14 | STCK | SYST | * | Store Clock; System Time from Clock 76 stored in main store location SYST |
| 15 | SL | R0, SYST | * | Logical Subtract of R0 from System Time to form Time Offset |
| 16 | ST | R0, TOFF | * | Store Time Offset into TOFF location of main store |
| 17 | LSR | R11, TOFF | * | Load Time Offset from TOFF into System Register 11 |
| 18 | RUS | (R7) | * | Resume User State, Reset S=0, Load instruction specified by R7 into I Reg. |
| 19 | | I19 | | |
| 20 | | I20 | | |
| 21 | | I21 | | |
| 22 | STCK | USRT | * | Store Clock; Low-order 32 bits from system time clock and high-order 32 bits from offset adder are stored in main store location USRT |
| | * | USER STATE | | |

In TABLE 9, the host computer is operating in system state and completes some instructions I1. In statement 2, the Load System Registers (LSR) instructions is one typical instruction included at the beginning of operation under control of the chief system control program. The LSR instruction has the function of loading the logical processor facility (LPF) system registers with initial values for the various registers. For example, in FIG. 5, the register 35 is loaded with the system address limit and in FIG. 6, registers 41 and 42 are loaded with the base address and the limit address for a particular domain. Similarly, the domain number is loaded into register 10 and the feature control word is loaded into register 15. The LSR instruction is a typical housekeeping instruction for loading the initial states of registers under program control in a conventional manner.

The source of data for loading the logical processor registers can be the data register 49 (see FIG. 7) from the main store 4. Of course, data can be loaded from any data bus in the system in accordance with conventional design.

With the registers appropriately loaded, the instruction stream continues with conventional instructions I3 and I4. In statement 5, the SCK instruction appears. The execution of the SCK instruction varies depending upon whether or not the host computer is in the system state or in the user state. If in the system state (S=1) and the Supervisor Mode (P=0), the SCK instruction is executed directly. The execution causes NEWT-G to be asserted to load the contents of memory location NEWTs into the system time clock 76 and TOFF-G is asserted to load all zeroes into register 77. The all 0's state in register 77, for the system state, means that any high-order bits of the System Time are not modified.

Since in TABLE 9, statement 5, the host computer was in system state, the SCK instruction is executed directly and all 0's are loaded into register 77. In statement 6, the LPSWR instruction causes the host computer to switch back to the user state. A decode of the LPSWR instruction causes the sequencer in FIG. 9 to assert the RESET S signal which resets the state register 9 (S=0) in FIG. 3. Also, the sequencer 66 as a decode of the LPSWR instruction causes the $PSW_u$ register 56, FIG. 8, to be loaded from the ESP region of main store. Thus, the next instruction is loaded into the I register 64 of FIG. 8 in a conventional manner. If the host computer is in system state (S=1) and Supervisor Mode, then the instruction can be executed directly, but if in Supervisor State and in Problem Mode, then a program interruption is caused because the SCK instruction is a privileged operation only valid in Supervisor Mode. The I7, I8 and I9 instructions are executed in user state.

In statement 10 of TABLE 9, the Set Clock (SCK) instruction again appears, this time, however, in user state. The SCK instruction cannot be executed directly in user state and hence decoder 65 causes the exception line 75 of FIG. 9 to be asserted. Since sense line 69 is a 0 (S=0) for user state, the fast assist unit 67 causes the fast assist operation to be entered. Entry of the fast assist causes the host computer to be in the system state (S=1) and loads the System GPR Registers with the contents shown in TABLE 9.

The statements 11 through 18 of TABLE 9 are a routine of instructions for executing the SCK instruction in system state for a user state which employed a Variant Time rather than a System Time. In statement 11, the N instruction does a logical AND test to determine if the host computer was in the Problem or Supervisor Mode.

Statement 12 causes a branch to the PRIV location in the instruction stream (not explicitly shown) if the results of the statement 11 instruction indicated a problem mode.

If not in a problem mode, the stream continues to statement 13 where the system GPR register R0 is loaded with the contents of main storage address NEWTu from the main store address specified system GPR R4. The address N stores the new time to be employed by the SCP in controlling the particular user state operation.

In statement 14, the Store Clock (STCK) instruction stores the System Time from the clock 76 of FIG. 10 into the main store location SYST. Since the host computer is in the system state and in the Supervisor Mode, the STCK instruction of statement 14 is executed directly.

In statement 15, the Subtract Logical (SL) instruction subtracts the New Time in the register system GPR R0 from the System Time from main store location SYST to form the Time Offset in the R0 register.

In instruction 16, the time offset calculated in statement 15 is stored into the main store location TOFF.

In instruction 17, the time offset from main store location TOFF is stored into system register R11 which is register 77 in FIG. 10.

This operation has loaded into the register 77 the offset of the Variant Time from the System Time.

In statement 18, the resume user state (RUS) instruction causes the host computer to return to the user state with the instructions specified by the address in the R7 register.

After executing the RUS instruction of statement 18, the next instruction is I19 followed by I20 and I21. These are any conventional user state instructions. In statement 22, the Store Clock (STCK) instruction appears. The STCK instruction causes the Variant Time to be stored. The Variant Time is the low-order 32 bits of the System Time from clock 76 of FIG. 10 together with the variant high-order bits. The variant high-order bits are formed as the sum of the high-order 32 bits from clock 76 and the offset (TOFF) from register 77. The Variant Time is stored in the main storage location USRT.

The Variant Time stored in statement 22 differs from the System Time stored in statement 14 of TABLE 9. The statements 14 and 22 represent variant operation in the executing of a single instruction, STCK, as a function of whether the host computer is in the system state or the user state. These instructions also represent the ability of the host computer with the logical processor facility to accommodate variant times.

While the variant time unit 79 of FIG. 10 is shown in one embodiment, as a device which adds an offset to the System Time, other devices are possible. For example, the variant time unit 79 can include a 64-bit variant time clock analogous to the system time clock 76. In operation, each clock is stepped by the same one MHz clock signal. Provision is made to preset the variant time clock to a different time than the System Time where the difference is the amount of TOFF. Upon execution of STCK in system state, the System Time output from the system time clock is employed and upon execution of STCK in user state, the Variant Time from the variant time clock is selected directly. Other similar devices for providing a Variant Time can be employed.

While the invention has been particularly shown and described with reference to the preferred embodiments thereof, it will be understood by those skilled in the art that changes in form and details may be made therein without departing from the spirit and the scope of the invention.

What is claimed is:

1. A data processing system responsive to an instruction stream, comprising:

a central processing unit generating requests for channel operations under control of a dynamically selected one of a plurality of system control programs, each for coordinating operation of the data processing system;

a main storage unit connected to the central processing unit, storing the plurality of system control programs;

a plurality of channels, connected to the central processing unit, for performing channel operations requested by the central processing unit and generating requests for interrupts;

a logical processor including means, in communication with the central processing unit and the main storage unit, for dynamically selecting a current system control program from the plurality of system control programs to control the central processing unit, and means for storing an identifier of the dynamically selected current system control program; and interrupt routing means, in communication with the central processing unit, the logical processor and the plurality of channels, for routing requests for interrupts supplied by the channels to the central processing unit, including a plurality of logical channel means, in communication with corresponding ones of the plurality of channels and responsive to a request for channel operation from the central processing unit supplied to the corresponding channel, for reading and storing a request identifies indicative the dynamically selected current system control program controlling the central processing unit when the request is made; and control means, responsive to a request for an interrupt by a channel and connected to the logical processor means and the plurality of logical channel means, for comparing the identifier of the dynamically selected current system control program stored in the logical processor with the request identifier stored in the logical channel means to generate a comparison and controlling the interrupt routing means in response to the comparison; and means, in communication with the logical processor and responsive to the control means, for signalling the logical processor to dynamically select a system control program, other than the dynamically selected current system control program, if a match is not indicated by the comparison.

2. The data processing system of claim 1, wherein the logical processor further includes:

means for notifying the interrupt routing means when a new current system control program is dynamically selected.

3. The data processing system of claim 1, wherein one of the plurality of system control programs is a chief system control program for coordinating operation of the plurality of system control programs in the data processing system, wherein;

the means for signalling signals the logical processor to dynamically select the chief system control program is a match is not indicated by the comparison.

4. The data processing system of claim 1, wherein the logical processor further includes:

main storage mapping means, in communication with the central processing unit and the main storage unit, for mapping addresses generated by the central processing unit to an address within a domain of addresses for accessing the main storage unit, and an address mapping storage location for storing a domain parameter specifying a domain of addresses allocated to the dynamically selected system control program.

5. A data processing system responsive to an instruction stream, comprising:

a central processing unit under control of an plurality of system control programs for coordinating operation of the data processing system and generating requests for channel operations, wherein one of the plurality of system control programs is a chief system control program for coordinating operation of the plurality of system control programs in the data processing system;

a main storage unit, connected to the central processing unit, storing the plurality of system control programs;

a plurality of channels, connected to the central processing unit, for performing channel operations requested by the central processing unit and generating requests for interrupts; and a logical processor including a state control storage location, in communication with the central processing unit and loadable under control of the chief system control program or another of the plurality of system control programs in response to the processing of instructions in the central processing unit, for storing a state control signal specifying a system state controlled by the chief system control program or a user state controlled by another of the plurality of system control programs;

a control means, in communication with the central processing unit, for switching control of the central processing unit between the system state and the user state in response to the state control signal to dynamically select the chief system control program of another of the plurality of system control programs and for storing an identifier of the dynamically selected system control program;

feature control means, in communication with the central processing unit, for controlling processing of instructions in the central processing unit in the user state as a function of a variant of the host architecture, said feature control means including a feature control storage location, loadable under control of the chief system control program to identify another of the plurality of system control programs, for storing parameters specifying the variant to which the system control program identified in the feature control storage location is adapted; and main storage mapping means, in communication with the central processing unit and the main storage unit, for mapping addresses generated by the central processing unit in the user state to an address within a domain of addresses for accessing the main storage unit, and having an address mapping storage location, loadable under control of the chief system control program to assign a domain to the system control program identified in the feature control storage location, for storing a domain parameter specifying a domain of addresses allocated to the system control program identified in the feature control storage locations; and interrupt routing means, in communication with the central processing unit, the logical processor and the plurality of channels, for routing requests for interrupts supplied by the channels to the central processing unit, including a plurality of logical channel means, in communication with corresponding ones of the plurality of channels and responsive to a request for channel operation from the central processing unit supplied to the corresponding channel, for reading and storing the identifier of the dynamically selected system control program controlling the central processing unit when the request is made; and control means, responsive to a request for an interrupt by a channel and connected to the logical processor and the plurality of logical channel means, for comparing the identifier of the dynamically selected system control program stored in the logical processor with the identifier of the system control program stored in the logical channel means to generate a comparison and for controlling the interrupt routing means in response to the comparison.

6. The data processing system of claim 5, wherein the identifier of the dynamically selected system control program includes the domain parameter.

7. The system of claim 5, wherein the central processing unit includes instruction decoding and sequencing means for controlling the execution of instruction sequences in the central processing unit, and the feature control means controls the instruction decoding and sequencing means as a function of the state control signal and of the variant specified by the parameters stored in the feature control storage location.

8. The system of claim 7, wherein the feature control means is connected to the instruction decoding and sequencing means to provide a different decoded instruction in the instruction sequence as a function of the variant specified by the parameters stored in the feature control storage location and as a function of the state control signal.

9. The apparatus of claim 7, wherein the instruction decoding and sequencing means is further responsive to status information generated in the central processing unit and to the instruction stream in controlling execution of the instruction sequence, and further including a user status storage location for storing a user program status word;

a system status storage location for storing a system program status word; and means, responsive to the state control signal, for selecting the user program status word or the system program status word as the status information for supply to the instruction decoding and sequencing means.

10. The system of claim 5, further including:

system timer means for providing a system time value, variance timer means for providing a variant time value different from the system time value; and means, in communication with the central processing unit and responsive to the state control signal, for selecting the system time value or the variant time value for supply to the central processing unit.

11. A data processing system responsive to instructions, comprising:

a plurality of central processing units, each under control of a dynamically selected one of a plurality of system control programs and generating requests for channel operations;

a main storage unit, connected to the plurality of central processing units, storing the plurality of system control programs;

a plurality of channels, connected to the plurality of central processing units, for performing channel operations requested by the central processing units and generating requests for interrupts;

a plurality of logical processors, each including means, in communication with corresponding ones of the plurality of central processing units and the main storage unit, for dynamically selecting a current system control program from the plurality of system control programs to control the corresponding central processing unit, and means for storing an identifier of the current dynamically selected system control program;

interrupt routing means, in communication with the plurality of central processing units, the plurality of logical processors and the plurality of channels, for routing requests for interrupts supplied by the channels to the central processing units, including a plurality of logical channel means, each in communication with corresponding ones of the plurality of channels and responsive to a request for channel operation from one of the plurality of central processing units and supplied to the corresponding channel, for reading and storing a request identifier indicating the dynamically selected current system control program controlling the central processing unit from which the request for channel operation is made, and for determining and storing a CPU identifier indicating the one of the plurality of central processing units from which a request for a channel operation is made;

means, responsive to a request for an interrupt by a channel and connected to the plurality of logical processors and the plurality of logical channel means, for comparing the identifiers of the dynamically selected current system control programs stored in the plurality of logical processors with the request identifier of the system control program stored in the logical channel means from which the request for an interrupt is made to generate a comparison and for controlling the interrupt routing means in response to the comparison; and means, responsive to a request for an interrupt by a channel and connected to the plurality of logical processors and the plurality of logical channel means, for controlling the interrupt routing means to supply the request for an interrupt to the central processing unit indicated by the CPU identifier.

12. The data processing system of claim 11, wherein each of the plurality of logical processors further includes:
  means for notifying the interrupt routing means when a new current system control program for controlling a particular central processing unit is dynamically selected.

13. The data processing system of claim 11, wherein one of the plurality of system control programs is a chief system control program for coordinating operation of the plurality of system control programs in the data processing system, wherein the interrupt routing means further includes:
  means in communication with the plurality of logical processors, for signalling the logical processor corresponding to the central processing unit indicated by the CPU identifier to dynamically select to the chief system control program if a match is not detected.

14. A data processing system responsive to instructions, comprising:
  a plurality of central processing units, each under control of a dynamically selected one of a plurality of system control programs and generating requests for channel operations, wherein one of the plurality of system control programs is a chief system control program for coordinating operation of the plurality of system control programs in the data processing system;
  a plurality of logical processors, each including:
    means, in communication with corresponding ones of the plurality of central processing units and the main storage unit, for dynamically selecting a current system control program from the plurality of system control programs to control the corresponding central processing unit,
    means for storing an identifier of the dynamically selected current system control programs, and
    a state control storage location, in communication with the corresponding central processing unit and loadable under control of the chief system control program or another of the plurality of system control programs in response to the processing of instructions in the corresponding central processing unit, for storing a state control signal specifying a system state controlled by the chief system control program or a user state controlled by another of the plurality of system control programs;
    a control means, in communication with the corresponding central processing unit, for switching control of the corresponding central processing unit between the system state and the user state in response to the state control signal;
    feature control means, in communication with the corresponding central processing unit, for controlling processing of instructions in the corresponding central processing unit in the user state as a function of a variant of the host architecture, said feature control means including a feature control storage location, loadable under control of the chief system control program to identify another system control program of the plurality of system control programs, for storing parameters specifying the variant to which the identified system control programs is adapted; and
    main storage mapping means, in communication with the corresponding central processing unit and the main storage unit, for mapping addresses generated by the corresponding central processing unit in the user state to an address within a domain of addresses for accessing the main storage unit, and having an address mapping storage location, loadable under control of the chief system control program to assign a domain to the system control program identified in the feature control storage location for storing parameters specifying a domain of addresses allocated to the system control program identified in the feature control storage location; and
  interrupt routing means, in communication with the plurality of central processing units, the plurality of logical processors and the plurality of channels, for routing requests for interrupts supplied by the channels to the central processing units, including
    a plurality of logical channel means, in communication with corresponding ones of the plurality of channels and responsive to a request for channel operation from one of the plurality of central processing units and supplied to the corresponding channel, for reading and storing a request identifier indicating the dynamically selected current system control program controlling the central processing unit when the request for channel operation is made;
    means, responsive to a request for an interrupt by a channel and connected to the plurality of logical processors and the plurality of logical channel means, for comparing the identifiers of the dynamically selected system control programs stored in the plurality of logical processors with the request identifier stored in the logical channel means to generate a comparison and for controlling the interrupt routing means in response to the comparison.

15. The data processing system of claim 14, wherein:
  the identifier of the dynamically selected current system control program is a domain number identifying the domain of addresses allocated to the dynamically selected current system control program operating in the user state; and
  each of the logical processors includes means for storing a domain central processing unit number uniquely identifying the corresponding central processing unit;
  each of the logical channel means each includes means for storing a state control signal, a domain number and a domain central processing unit number for each channel operation identifying the state, the domain and the central processing unit from which the request for channel operation is made and for supplying the stored state control signal, domain number and domain central processing unit number with a request for an interrupt; and
  the interrupt routing means is responsive to the state control signal, the domain number and the domain central processing unit number supplied by a channel upon completion of a channel operation, for routing interrupts among the central processing units.

16. The system of claim 15, wherein the logical channel means include:
  channel main storage mapping means for mapping addresses in a channel operation to an address within the domain of addresses for accessing the main storage unit specified by the domain number stored for the channel operation which generates the address.

17. The system of claim 16, each of the central processing units further includes:
a mode control storage location, in communication with a corresponding central processing unit and loadable under control of the dynamically selected system control program currently controlling the central processing unit, for storing a mode control signal specifying a supervisor mode under which a privileged set of instructions is executable in the central processing unit or a problem mode under which a nonprivileged set of instructions is executable in the central processing unit; and
means for switching control of the corresponding central processing unit between the supervisor mode and the problem mode in response to the mode control signal.

18. The system of claim 17, wherein the instructions supplied to the system include a special set of instructions executed only in the system state in the central processing unit under control of the chief system control program, the special set including instructions for coordinating operation of the plurality of system control programs.

* * * * *